Nov. 27, 1923.
W. METZGER
1,475,270
SPRING LUBRICATOR
Filed Dec. 10, 1921
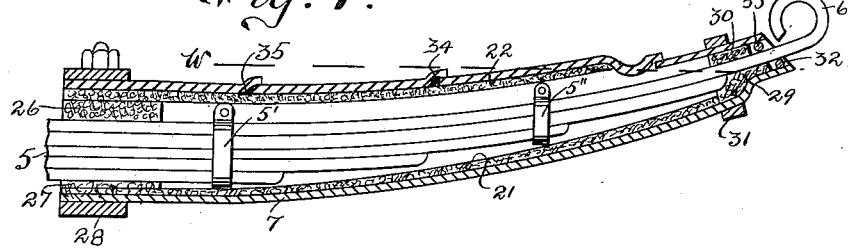
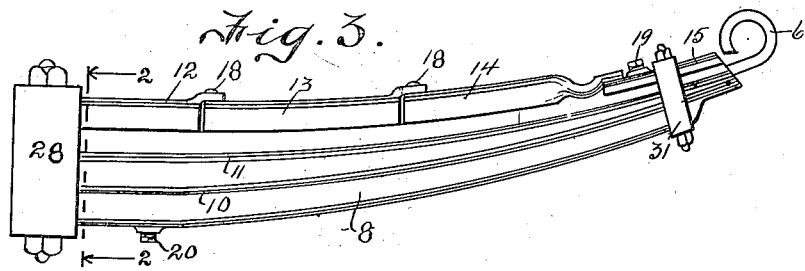
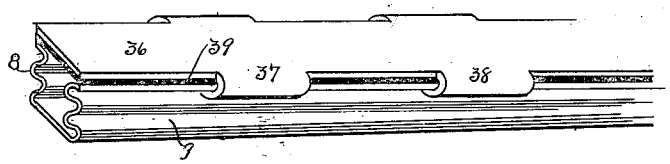
Inventor
William Metzger
By his Attorney Patented Nov. 27, 1923.

1,475,270

UNITED STATES PATENT OFFICE.

WILLIAM METZGER, OF NEW YORK, N. Y.

SPRING LUBRICATOR.

Application filed December 10, 1921. Serial No. 521,352.

*To all whom it may concern:*

Be it known that I, WILLIAM METZGER, a subject of the King of Hungary, and resident of the borough of Manhattan, city, county, and State of New York, have invented new and useful Improvements in Spring Lubricators, of which the following is the specification.

The device the subject of this invention is intended primarily as a means for lubricating the springs of an automobile, to prevent the very annoying squeaks, and to increase their resiliency and operative area and to improve the riding conditions of the vehicle. This device has other advantages and fulfills other objects, one of the most important of which is to prevent grit and dust from resting upon the springs and slowing becoming engaged therebetween.

Another object of the invention is to provide a flexible covering for leaf springs, that will follow every movement of the spring, that will not restrict the springs to the slightest degree and that will prevent moisture of water, used in washing the vehicle, lodging between the springs and causing rust or corrosion.

To accomplish these objects and others not specifically referred to I have devised and invented the mechanisms which will be described in the specification which follows, and the accompanying drawing should be referred to for a complete understanding of the specification.

In the drawing:

Fig. 1. is a longitudinal, sectional view of my device, the vehicle springs are, however, shown in elevation.

Fig. 2. is a transverse, sectional view, approximately upon the line 2—2 in Fig. 3.

Fig. 3. is a side elevation.

Fig. 4. is a fractional view of a modification. Similar reference numerals indicate like parts in all the figures where they appear:

At 5 I show an automobile spring. This spring may and probably will be a flat leaf spring having a plurality of members imposed one upon the other and each successive member or layer being somewhat shorter than the next preceding layer. The longest spring leaf or member is usually supported with an eye as shown at 6 into which the toggle will engage.

It is not my intention to vary the size, construction or operation of the spring nor in fact to make changes of any nature therein, as the device, the subject of this application is intended to be used upon springs of any type.

My device consists of a trough member having a bottom portion 7 formed or arched in a manner to follow the general contour of the spring and formed integral with the bottom portion or upwardly extending side members 8 and 9 and it will be noted in Figs. 2 and 3 that the side members are fluted or provided with a plurality of corrugations as shown at 10 and 11. The number of these corrugations may be varied at will, but it is desired that there be sufficient corrugations to provide a high degree of resiliency and to allow the sides to be extended and retracted to follow the movement of the spring and to follow the contour of the spring, that is the corrugations will be drawn out at the inner end of the spring and closed together at the outer end of the spring 6, giving to the casing and particularly the sides thereof, a tapered effect.

Over the uppermost open side of the casing, I arrange a cover, consisting of a plurality of parts as shown at 12, 13, 14 and 15 and as shown in Fig. 2 each part is provided with the lips 16 and 17, rolled downward and adapted to engage the topmost corrugation and adjacent channel. The cover is made in a plurality of parts and of flexible material so that it may be readily engaged upon the side members, though the side members can be flexed inward to an extent sufficient to allow the cover members to be placed in position and the supported members may be secured together by means of bolts, nuts or pins 18. I provide an inlet passage closed at the plug 19 and an outlet passage closed at the plug 20, which will be later referred to.

It will be noted that this device is sufficiently large to enclose the springs 5 and the spring clips 5' and 5" and within the casing and over the spring clips and extending the full length of the interior of the casing are fibrous or felt members, one arranged upon the bottom as shown at 21, another at the top or end or upon the cover as shown at 22 and others at the sides as shown at 23 and 24.

The object of these felt members is to prevent contact of metal to metal and they also serve as packing members. At the inner end of the device, increased thicknesses of felt are provided as shown at 27 and 26, the object being to allow these heavy felt members to be compressed upon the spring by the clamp 28 to make the inner end tight and to prevent leakage at the end of my device. At the outer or free end I also provide quite thick fibrous members 29 and 30, and a clamp 31 surrounding the casing causes these fibrous members to impinge upon the longest leaf of the spring. It should not, however, be clamped tight to the spring as there must be a relative movement between the spring and the casing to allow the spring to operate freely and to prevent friction between the cover and the spring I provide rollers as shown at 32 and 33.

With my device as constructed and placed as shown, the plug 19 is removed and a desidable quantity of quite heavy oil is poured into the casing, until the oil reaches approximately the dotted line W which may be considered the "liquid level line," after which the plug 19 is replaced and the device ready for use. I may provide packings 34 and 35 between adjacent sections of the cover to retain the oil and to prevent metallic sounds. The presence of free oil surrounding the springs will insure proper lubrication of the springs as in every action the spring leaves rub upon each other and supported over each other to an extent to insure that oil will pass between the spring leaves. Not only does my device insure lubrication but by so doing it increases the life of the spring leaves, prevents disagreeable noises and spring squeaks.

In Fig. 4, I show a cover 36 having any number of projections 37 and 38 which may be bent downward to engage the upper edge of the sides 8 and 9, and in this construction I will provide that a strip of felt 39 will extend the full length and width of the open upper part of the casing to prevent the rubing of the cover member and the lubricant passing outward under the edges of the cover, and other modifications may be made within the scope of the appended claims without departing from the principle or sacrificing the advantages of the invention.

Having carefully and fully described my invention what I claim and desire to obtain by Letters Patent is:

1. A cover for leaf springs comprising a bottom member, corrugated side members and a top adapted to be received and retained by the corrugations of the side members.

2. The combination of a leaf spring and a flexible metallic enclosing means therefor, the sides of which enclosing means are corrugated longitudinally.

3. The combination of a leaf spring and a flexible metallic enclosing means therefor, the sides of which enclosing means are corrugated longitudinally, one end of all said enclosing means and corrugations converging upon a common angle.

Signed New York city, in the county and State of New York this 7 day of Dec. 1921.

WILLIAM METZGER.